US010223803B2

(12) United States Patent
Chaouch

(10) Patent No.: US 10,223,803 B2
(45) Date of Patent: Mar. 5, 2019

(54) METHOD FOR CHARACTERISING A SCENE BY COMPUTING 3D ORIENTATION

(71) Applicant: COMMISSARIAT A L'ENERGIE ATOMIQUE ET AUX ENERGIES ALTERNATIVES, Paris (FR)

(72) Inventor: Mohamed Chaouch, Arcueil (FR)

(73) Assignee: COMMISSARIAT A L'ENERGIE ATOMIQUE ET AUX ENGINES ALTERNATIVES, Paris (FR)

( * ) Notice: Subject to any disclaimer, the term of this patent is extended or adjusted under 35 U.S.C. 154(b) by 0 days.

(21) Appl. No.: 15/779,063

(22) PCT Filed: Nov. 21, 2016

(86) PCT No.: PCT/EP2016/078236
§ 371 (c)(1),
(2) Date: May 24, 2018

(87) PCT Pub. No.: WO2017/093057
PCT Pub. Date: Jun. 8, 2017

(65) Prior Publication Data
US 2018/0357784 A1 Dec. 13, 2018

(30) Foreign Application Priority Data

Dec. 1, 2015 (FR) ...................................... 15 61657

(51) Int. Cl.
*G06T 7/73* (2017.01)
*G06T 7/77* (2017.01)
(Continued)

(52) U.S. Cl.
CPC ................ *G06T 7/73* (2017.01); *G06T 7/593* (2017.01); *G06T 7/77* (2017.01); *H04N 13/271* (2018.05);
(Continued)

(58) Field of Classification Search
CPC .......... G06T 7/77; G06T 7/593; H04N 13/271
See application file for complete search history.

(56) References Cited

U.S. PATENT DOCUMENTS

2013/0083967 A1* 4/2013 Vorobiov ................ G06T 7/593
382/103
2015/0161818 A1* 6/2015 Komenczi ............... G06T 17/00
348/43

OTHER PUBLICATIONS

A. Dargazany et al., "Terrain Traversability Analysis using Organized Point Cloud, Superpixel Surface Normals-based segmentation and PCA-based Classification," 7th Workshop on Field & Assistive Robotics, Oct. 17, 2014, pp. 1-6, XP055295757.
(Continued)

*Primary Examiner* — Edward Park
(74) *Attorney, Agent, or Firm* — Baker Hostetler LLP

(57) ABSTRACT

A method for characterizing a scene by computing the 3D orientation of observed elements of the scene comprises a step of computing 3D points of the scene and further comprises the steps of: regularly quantifying the 3D points of the scene, along three axes, in a preset 3D grid of voxels; for each non-empty voxel of the 3D grid, computing N predefined statistical characteristics from the coordinates of the points contained in the voxel, where N is an integer higher than 1, and for each of the N characteristics, defining a 3D grid associated with the characteristic; for each 3D grid associated with a statistical characteristic, computing an integral 3D grid associated with the statistical characteristic, each voxel of the integral 3D grid comprising an integral of said statistical characteristic; and for each non-empty voxel of the 3D grid of voxels: defining a 3D rectangular parallelepipedal vicinity centered on the voxel and of predefined 3D dimensions, and eight vertices of the vicinity; for each of the N statistical characteristics, computing the integral of the statistical characteristic in the vicinity on the basis of the
(Continued)

eight vertices of the integral 3D grid associated with the statistical characteristic; computing the 3×3 covariance matrix of the 3D points in the vicinity; and computing the orientation of the voxel on the basis of the 3×3 covariance matrix.

8 Claims, 2 Drawing Sheets

(51) Int. Cl.
     *H04N 13/271*      (2018.01)
     *G06T 7/593*      (2017.01)

(52) U.S. Cl.
     CPC ............... *G06T 2207/10012* (2013.01); *G06T 2207/10028* (2013.01)

(56) References Cited

OTHER PUBLICATIONS

I. Bogoslavskyi et al., "Efficient traversability analysis for mobile robots using the Kinect sensor," IEEE 2013 European Conference on Mobile Robots, Sep. 25, 2013, pp. 158-163, XP032548193.

R. Julian et al., "Voxel planes: Rapid visualization and meshification of point cloud ensembles," 2013 IEEE/RSJ International Conference on Intelligent Robots and Systems, Nov. 3, 2013, pp. 3731-3737, XP032537835.

D. Holz et al., "Real-Time Plane Segmentation Using RGB-D Cameras," Lecture Notes in Computer Science, Jan. 1, 2012, XP055141796.

\* cited by examiner

METHOD FOR CHARACTERISING A SCENE BY COMPUTING 3D ORIENTATION

CROSS-REFERENCE TO RELATED APPLICATIONS

This application is a National Stage of International patent application PCT/EP2016/078236, filed on Nov. 21, 2016, which claims priority to foreign French patent application No. FR 1561657, filed on Dec. 1, 2015, the disclosures of which are incorporated by reference in their entirety.

FIELD OF THE INVENTION

The field of the invention is that of the analysis of a scene via 3D data or image processing.

More precisely, the invention relates to the computation of the 3D orientation of elements of the scene, with a view to extracting geometric characteristics. The latter may be used in machine vision algorithms, such as algorithms for automatically segmenting the observed scene, i.e. for automatically partitioning the scene into a plurality of constituent elements, each of these elements being a coherent subset such as a given object. Specifically, an object is not only a visual unit that is coherent in terms of color and/or texture, but also a spatial unit that is coherent in terms of 3D orientation.

BACKGROUND

The contexts of application of the invention are in particular:
  The analysis and detection of dominant structures (ground, walls, etc.).
  The segmentation of the scene.
  The detection of 3D obstacles.

Nevertheless, it would be wrong to consider the use of orientations to be limited to these applications. Orientations may be used in any system for analyzing, on the basis of 3D data, scenes in real-time.

The computation of orientations is a field explored in machine vision and image processing, but essentially for images representing 3D information.

There are different types of 3D vision system:

Systems of the 3D scanner or time-of-flight (TOF) camera type: this type of 3D sensor delivers a depth map in which each pixel corresponds to the distance between a point of the scene and a specific point. The depth maps obtained are generally quite precise, but they nevertheless contain aberrations (e.g. speckle for TOF images). The cost of these systems is high (one or more thousands of dollars), limiting their use to applications where cost is not a great constraint. In addition, many of these 3D sensors cannot be used in real-time applications, because of the low frequency of the images; and systems of the stereoscopic type, which are generally composed of an array of cameras and/or projectors that are associated with specific processing operations (disparity computation). They are suitable for real-time applications and their cost is much lower: they cost the same as standard cameras (such cameras are already sometimes already present in other applications, mention being made, by way of example, of "reversing cameras"). In contrast, these images are more noisy (sensitivity to lighting conditions, problem with surfaces with too smooth a texture, etc.), and the depth map deduced from the disparity map is not dense. The non-linear conversion of the disparity map to the depth map leads to the density of information in the depth map being nonuniform. Typically, data closer to the camera are denser, and data at the border of objects may be imprecise.

Existing real-time solutions compute 3D characteristics from 2D media. The following process, which is illustrated in FIG. 1, is common to these methods:

On the basis of a 3D depth or disparity map, a 3D map of points is computed. It will be recalled that a 3D depth or disparity map is a perspective or orthogonal projection of the 3D space onto a 2D plane; it is in fact a question of 2D images with which depth information is associated. A depth z is associated with each pixel of the (x, y) plane of the image: $p(x,y)=z$. On the basis of $p(x,y)$ and of z, the X, Y and Z coordinates of the corresponding point of the scene are obtained by processing these data in a way known to those skilled in the art. After processing all of the pixels, a 3D point cloud is obtained the coordinates in the scene of which are represented by a 2D image for each of the X, Y and Z components of the scene: a 2D image in which each pixel is associated with its X coordinate, a 2D image in which each pixel is associated with its Y coordinate, and the a 2D image in which each pixel is associated with its Z coordinate;

characteristics are computed in each of the three 2D images or in a combination of these images: for each pixel, statistical characteristics (averages, correlations, etc.) are computed using the 3D map of points;

integral images associated with these characteristics are computed and stored in memory: an integral image is computed for each characteristic. It will be recalled that an integral image is an intermediate image of the same dimensions as the 3D map of points and such that the value associated with each pixel is equal to the sum of the values of the preceding pixels; and 3D orientation is computed: for each pixel or super pixel (=a group of a few pixels), a rectangular 2D zone centered on the pixel is defined. Characteristics are computed locally in this rectangular zone using the integral images. To compute each characteristic (defined by the sum of the values in this rectangular zone) the corresponding map need be accessed only four times, once per vertex of the rectangular zone. Using the characteristics computed on this rectangle, a principal component analysis is carried out, and the orientation is given by the eigenvector associated with the smallest eigenvalue.

By way of example of such a stereoscopic system, mention may be made of that described in the publication "Terrain Traversability Analysis using Organized Point Cloud, Superpixel Surface Normals-based segmentation and PCA-based Classification" by Dargazany Aras and Karsten Berns [Dar2014], which was published in 2014. The authors present a system for analyzing terrain and helping unmanned ground vehicles to navigate (and, more particularly, to analyze the traversability of terrain). The reformulated problem is divided into two main problems: surface detection and analysis. The proposed approach uses a stereoscopic system to generate a dense point cloud from a disparity map.

In order to segment the elements of the scene into a plurality of surfaces (which are represented by superpixels), the authors propose to apply an image segmentation method to the point cloud, this method employing 3D orientations.

To analyze the surfaces of the scene, the authors introduce a new method called SSA (Superpixel Surface Analysis). It is based on the orientation of the surface, on the estimation of its plane and on the analysis of traversability using the planes of the superpixels. This method is applied to all the detected surfaces (segments of superpixels) in order to classify them depending on their traversability index. To do this, five classes are defined: traversable, semi-traversable, non-traversable, unknown and undecided.

However, the results obtained by this system do not have a uniform precision for each point of the 3D cloud.

Therefore, there remains to this day a need for a method for characterizing a scene by computing the 3D orientation of the observed elements that simultaneously meets all of the aforementioned requirements, in terms of computing time, of obtained precision and of cost of the computing device.

SUMMARY OF THE INVENTION

More precisely, one subject of the invention is a method for characterizing a scene by computing the 3D orientation of observed elements of the scene, this including a step of computing 3D points of the scene, said method being characterized in that it furthermore includes steps of:

regularly quantifying the 3D points of the scene, along three axes, in a preset 3D grid of voxels;

for each non-empty voxel of the 3D grid, computing N predefined statistical characteristics from the coordinates of the points contained in the voxel, where N is an integer higher than 1, and for each of the N characteristics, defining a 3D grid associated with said characteristic;

for each 3D grid associated with a statistical characteristic, computing an integral 3D grid associated with said statistical characteristic, each voxel of the integral 3D grid comprising an integral of said statistical characteristic; and for each non-empty voxel of the 3D grid of voxels:
defining a 3D rectangular parallelepipedal vicinity centered on said voxel and of predefined 3D dimensions, and eight vertices of said vicinity;
for each of the N statistical characteristics, computing the integral of the statistical characteristic in said vicinity on the basis of the eight vertices of the integral 3D grid associated with said statistical characteristic;
computing the 3×3 covariance matrix of the 3D points in said vicinity; and
computing the orientation of said voxel on the basis of the 3×3 covariance matrix.

The orientation of the voxel is for example computed via a principal component analysis.

The N statistical characteristics are typically an average of coordinates and/or a weighting of coordinates and/or a correlation of coordinates and/or a standard deviation of coordinates and/or a higher-order moment of coordinates.

The dimensions of the vicinity are the same for each voxel.

The 3D points of the scene may be obtained directly from a 3D sensor or computed from a 3D disparity map obtained from a stereoscopic device acquiring 2D images of the scene.

The method according to the invention differs from those of the prior art in particular in the following three major ways:
use of the actual 3D vicinity of the point in the scene for the computation of the characteristics;
same 3D vicinity whatever the position of the voxel; and
use of integral volumes.

It allows:
an exact computation of the 3D orientation, taking into account the direct 3D vicinity of the point of the scene;
an approach requiring few computational resources and allowing a real-time deployment in standard and inexpensive computer architectures.

Specifically, the local characteristics allowing the orientation to be computed are optimized locally, taking into consideration only the direct 3D vicinity of the point.

Another subject of the invention is a computer program product, said computer program comprising code instructions allowing the steps of the described characterizing method to be carried out when said program is executed on a computer.

BRIEF DESCRIPTION OF THE DRAWINGS

Other features and advantages of the invention will become apparent on reading the following detailed description, which is given by way of nonlimiting example and with reference to the appended drawings, in which.

DETAILED DESCRIPTION

A depth map or disparity map is an (orthogonal or perspective) projection of 3D space onto a 2D plane. The result of this projection causes a partial loss of the notion of 3D vicinity between elements of the scene. As existing solutions rely on integral images, the local characteristics are systematically computed from 2D media (rectangular zones of the 2D image). These zones may contain a plurality of elements of the scene that are not necessarily close to one another. In these cases, substantial errors caused by the 2D vicinity corrupt the characteristics and particularly penalize the computation of 3D orientation.

Direct processing of the 2D image may allow certain characteristics of the initial scene to be determined, provided that additional information is provided or additional processing carried out.

However, the only way of determining local 3D characteristics precisely is to consider real space, which is of three-dimensional nature. Knowledge of the actual vicinity of the element in the scene has a substantial impact on the precision of the characteristics.

Figure 2:
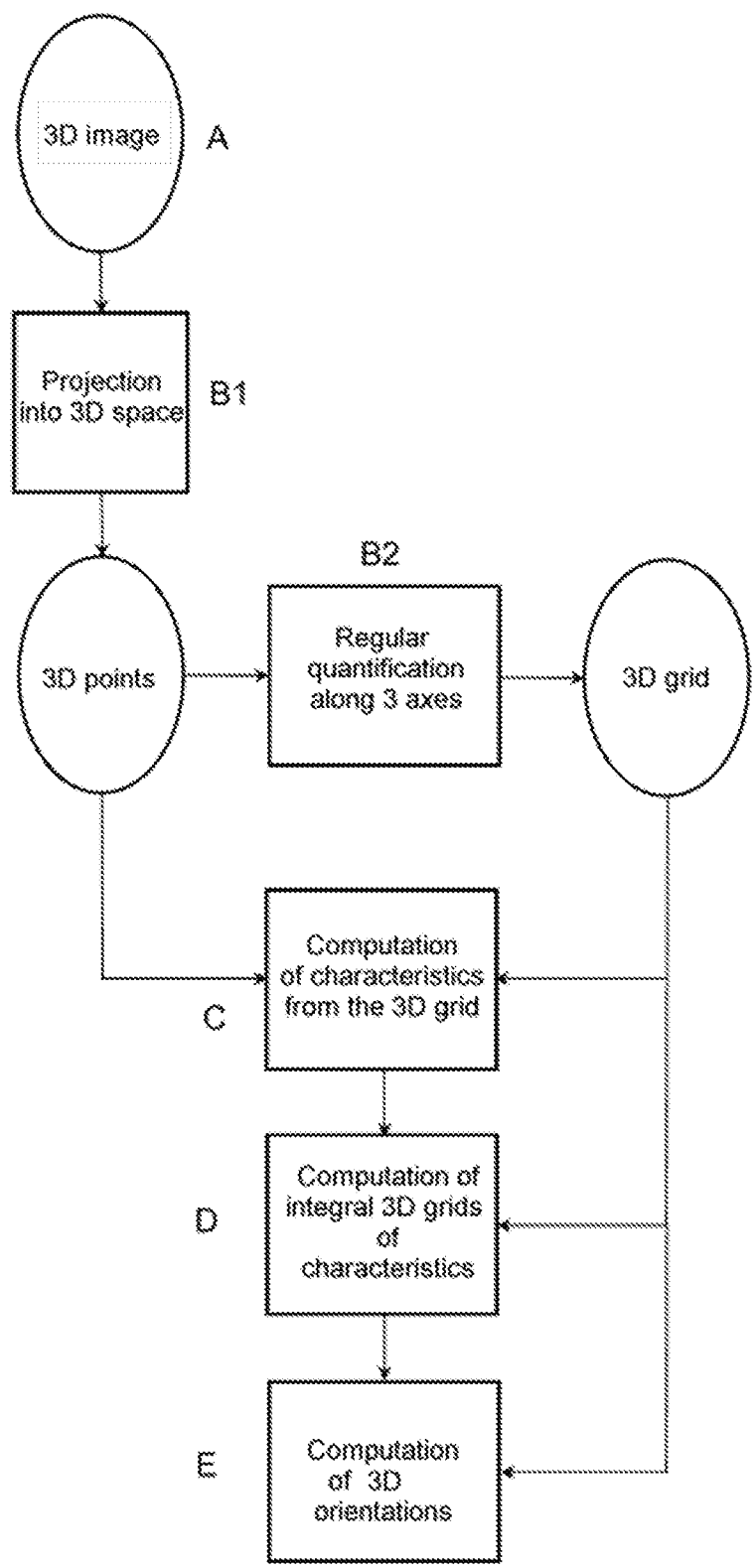
FIG. 2 schematically shows a flowchart of a characterizing method according to the invention.

The method according to the invention allows the 3D orientations of elements of the scene represented by a 3D (disparity or depth) map to be computed using a real-time method that takes into account the spatial density in a 3D vicinity close to the point of the scene for the computation of its orientation. More precisely, this method includes the following steps, which are described with reference to FIG. 2.

A) Acquisition of a depth or disparity map: the scene is observed using a 3D sensor such as an active or passive stereoscopic sensor, or a time-of-flight sensor, or a multiplanar LIDAR, delivering a depth or disparity map. Filters may be applied to the map in order to remove noise (noise of natural origin such as that due to rain, glare and/or dust, or noise associated with the sensors or processing).

B) Projection of the scene (B1) into 3D space and regularly quantifying it along three axes X, Y and Z (B2): the depth or disparity map is converted into a 3D point cloud for example using the following methods, one of which is based on a disparity image map provided by a stereoscopic system, and the other of which is based on a depth map provided by a 3D sensor.

With the first method, which is based on a disparity map provided by a stereoscopic system, each pixel of the disparity map is defined by two coordinates (u, v) and a disparity value d. To one disparity provided by a stereoscopic system corresponds one visible 3D point of the scene. The disparity d of a pixel and the z coordinate of the associated 3D point are related. This relationship is defined by the following equation:

$$z*d=B*f$$

Since the baseline B (distance between the two optical centers) and the focal length f (which is the same for both cameras) are constants, a variation in disparity d depends directly on a variation in the distance z between the object and the cameras. The 3D point of Cartesian coordinates (x, y, z) corresponding to the pixel of coordinates (u, v) and of disparity d is computed as follows:

$$z=B*f/d$$

$$x=(u-u0)*z/f$$

$$y=(v-v0)*z/f$$

The Cartesian coordinates (x, y, z) of the actual points corresponding to the pixels of the disparity map are thus known. This allows a 3D point cloud representing the scene to be obtained, the dimensions of the elements of which are real.

With the second method based on a depth map provided by a 3D sensor such as the commercially available Kinect™ sensor, each pixel of the depth map is defined by two coordinates (u,v) and a depth value z. For example, the depth provided by a Kinect™ for each pixel is the distance from an actual point to the sensor plane in mm. This distance is the z coordinate of the 3D point represented by the associated pixel (u, v). On the basis of this z coordinate, it is possible to define the 3D point by computing the two Cartesian coordinates x and y as follows:

$$x=2*z*\tan(\text{fov}_H/2)*u/u\text{Size}$$

$$y=2*z*\tan(\text{fov}_V/2)*v/v\text{Size}$$

where (u,v) are the coordinates of the pixel, (uSize,vSize) the size of the depth map, and $\text{fov}_H$ and $\text{fov}_V$ the (horizontal and vertical) fields of view of the Kinect™ (in radians).

The Cartesian coordinates (x, y, z) of the real points corresponding to the pixels of the depth map are thus known. This allows a 3D point cloud representing the scene to be obtained the dimensions of the elements of which are real.

It is also possible for this point cloud to be provided directly without the acquisition of a depth or disparity map. These points are then quantified in a predefined 3D grid composed of l×h×p cells (l cells along X, h cells along Y and p cells along Z), which is called the 3D origin grid. The limits of the 3D grid are chosen depending on the scene to be characterized. There may be a plurality of 3D points per cell. The terms cell and voxel are used interchangeably.

C) Computation of characteristics from the 3D grid: For each "turned-on" cell c(i,j,k) of the 3D origin grid (i varying from 1 to l, j varying from 1 to h, k varying from 1 to p), i.e. for each cell including at least one 3D point, N statistical characteristics are computed from the coordinates of the 3D points contained in said cell. Among such characteristics, mention may be made of the weighting of the coordinates, their averages, their correlations, their standard deviations, and their higher-order moments. In each empty (not turned on) cell c(i,j,k) of the grid, these statistical characteristics have values of zero. The characteristics computed for all the cells are stored in a new N-component 3D grid of characteristics; in other words, N 3D grids are obtained, each of which is respectively associated with one characteristic, namely, in our example, a 3D grid of weightings, a 3D grid of averages, a 3D grid of correlations, etc.

D) Computation of integral volumes: using the integral volume method, an N-component 3D-integral grid is computed from the N-component 3D grid of characteristics; in other words, N integral 3D grids are obtained, each of which is respectively associated with one characteristic, namely, in our example, an integral 3D grid of weightings, an integral 3D grid of averages, an integral 3D grid of correlations, etc. Each "integral volume" is a representation, taking the form of a numerical grid, of the same size as the origin grid. Each of its cells contains the sum of those cells of the characteristic grid which are located behind, above and to the left of the cell. The expressions "behind", "above" and "to the left" are used with reference to the orientation of the sensor. Insofar as the sensor may be positioned with other orientations, this directional terminology is indicated by way of illustration and is nonlimiting.

More explicitly, the integral volume vi is defined for a grid v by the following equation:

$$vi(i, j, k) = \sum_{i'=0}^{i} \sum_{j'=0}^{j} \sum_{k'=0}^{k} v(i', j', k')$$

where v(i, j, k) is the value of the voxel (i,j,k) of the grid v.

This triple sum may be computed recurrently using the following equation:

$$vi(i,j,k)=v(i,j,k)+vi(i,j,k-1)+vi(i,j-1,k)-vi(i,j-1,k-1)+vi(i-1,j,k)-vi(i-1,j,k-1)-vi(i-1,j-1,k)+vi(i-1,j-1,k-1)$$

The integral volume may therefore be computed efficiently, the origin grid needing to be scanned only once.

By virtue of this representation, to compute the sum of the values of the voxels of the grid v in a rectangular parallelepipedal volume, the integral volume vi need be accessed only eight times, and therefore this computation takes the same amount of time no matter what the size of the parallelepipedal zone. More formally, the sum of the voxels v(i, j, k) inside any 3D box defined by ($i_0$, $i_1$, $j_0$, $j_1$, $k_0$, $k_1$) may be computed using the following equation:

$$\sum_{i=i_0}^{i_1} \sum_{j=j_0}^{j_1} \sum_{k=k_0}^{k_1} v(i, j, k) = vi(i_1, j_1, k_1) - vi(i_1, j_1, k_0 - 1) -$$

$$vi(i_1, j_0 - 1, k_1) + vi(i_1, j_0 - 1, k_0 - 1) - vi(i_0 - 1, j_1, k_1) +$$

$$vi(i_0 - 1, j_1, k_0 - 1) + vi(i_0 - 1, j_0 - 1, k_1) - vi(i_0 - 1, j_0 - 1, k_0 - 1)$$

E) Computation of 3D orientations: for each turned-on cell c(i, j, k) of the 3D origin grid, a 3D vicinity is defined. It is a question of a rectangular parallelepipedal 3D volume (=rectangular 3D box) centered on said cell and the coordinates of the eight vertices of which are also defined. The dimensions of this volume are preset and parameterizable and are the same for each cell. They are typically determined experimentally, for example depending on the resolution of the 3D point cloud, the precision of the 3D information and also the size of the elements of the scene to be characterized, which resolution, precision and size are preset.

For each turned-on cell, and for each of the N characteristics, the integral of the characteristic is computed in the considered vicinity from the integral 3D grid associated with said feature. The way in which the integral of the characteristics is computed for each cell is based on the volume-integral method (details of which were given in the description of step D) allowing the values in these parallelepipedal rectangles (3D rectangular boxes) to be rapidly summed. This computation is carried out on the eight vertices of this volume, and thus this integral 3D grid need be accessed only eight times. Specifically, an integral of a characteristic i.e. a sum of the values of the characteristic in the parallelepipedal 3D volume, is computed via seven operations (three additions plus four differences) on the values of the integral of the characteristic, which values are those of the eight vertices (according to the last equation detailed in the description of step D) of the vicinity. Using the N integrals of characteristics computed in this volume centered on the cell, a data-analyzing method is carried out in order to deduce the 3D orientation therefrom.

By way of example, a principal component analysis may be applied and then the orientation is given by the principal component associated with the smallest eigenvalue of the 3×3 covariance matrix. In this case, the principal axes of a set of 3D points (here the 3D points contained in the rectangular parallelepiped centered on the cell) are computed and labelled in increasing order, depending on their eigenvalues. The 3×3 covariance matrix of the 3D points in the vicinity is computed using the N integrals of characteristics (weighting, averages, correlations) computed in the vicinity. Since the covariance matrix is a symmetric matrix that is defined positive, it is diagonalizable, and its eigenvalues are real positive numbers and its orthogonal eigenvectors are the sought-after principal components. The eigenvector associated with the smallest eigenvector is the normal characterizing, locally, the orientation of the cell. Thus, the orientation of each turned-on cell $c(i,j,k)$ of the 3D origin grid is obtained.

Thus, the use of a volumic vicinity in a 3D grid comprising values of the integrals of statistical characteristics allows the 3×3 covariance matrix to be efficiently computed for this vicinity with a view to deducing therefrom the orientation of a cell on which the vicinity is centered.

The method according to the invention differs from those of the prior art in particular in the following three major ways:
  use of the actual 3D vicinity of the point in the scene in the computation of the characteristics;
  same 3D vicinity whatever the position of the voxel; and
  use of integral volumes.
It allows:
  an exact computation of 3D orientation, taking into account the direct 3D vicinity of the point of the scene;
  an approach requiring few computational resources and allowing a real-time deployment in standard and inexpensive computer architectures.

Specifically, the local characteristics allowing the orientation to be computed are optimized locally, taking into consideration only the direct 3D vicinity of the point. In addition, the dimensions of the vicinity are the same whatever the position of the point in space.

This is novel with respect to the approaches of the prior art, which propose to compute geometric characteristics from a fixed 2D medium, because then the size of the fixed 2D medium is not commensurate with the physical (geometric) reality and, hence, in this 2D medium, the defined zones may contain a plurality of scene elements that are not necessarily close to one another.

The present invention allows 3D vision of the environment to be improved, and therefore the results of subsequent processing operations to be improved, while maintaining a low system cost that makes it viable to use the invention in real-time in many contexts. The invention has for example been implemented on an ARM™ processor integrated into a cell phone, the orientations being obtained in less than 30 MS.

Orientation characteristics are useful in applications such as the detection of 3D obstacles, the categorization of 3D obstacles, the detection of the elements structuring a scene (such as the ground, walls, etc.), and the segmentation and analysis of a 3D scene (in particular the segmentation and analysis of the ground).

This method for characterizing a scene by computing 3D orientation may in particular be implemented using a computer program product, this computer program comprising code instructions allowing the steps of the reconstruction method to be carried out. This program is recorded on a medium that can be read by computer. The medium may be electronic, magnetic, optical, electromagnetic or be a relay medium of infrared type. Examples of such media are semiconductor memories (random access memory RAM, read-only memory ROM), tapes, floppy disks or magnetic or optical disks (compact disk-read-only memory (CD-ROM), compact disk-read/write (CD-R/W) and DVD).

Figure 1:
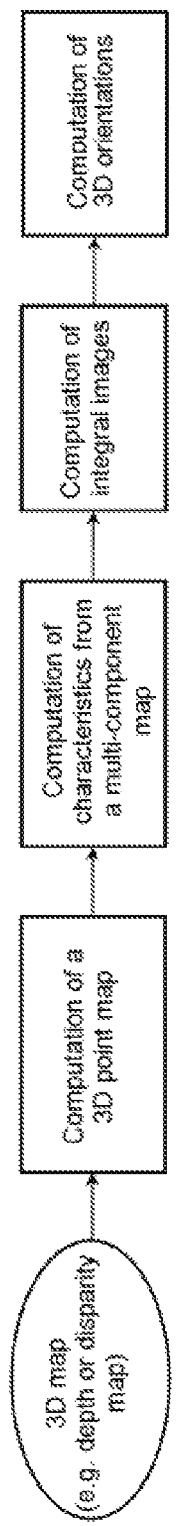
FIG. 1 schematically shows a flowchart of a characterizing method according to the prior art.
Figure 3:
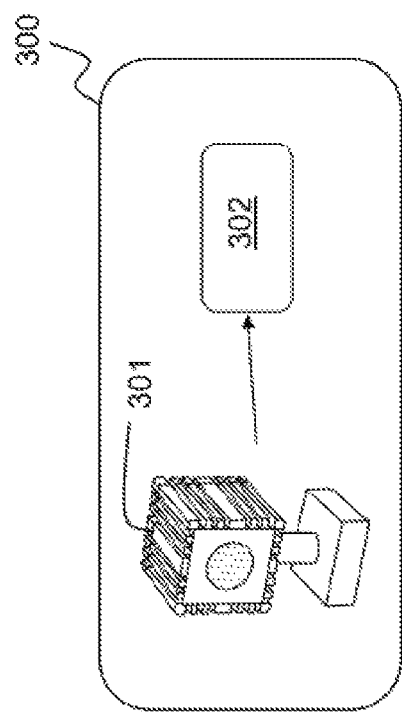
FIG. 3 schematically shows a device for characterizing a scene, said device being configured to implement the invention.

FIG. 3 schematically show shows a device 300 that is configured to implement the invention. Such a device 300 includes a means 301 for capturing a 3D representation of a scene and a means 302 for processing the captured data, said means being configured to execute the various embodiments of the method according to the invention such as described above.

The capturing means 301 may be of any of the types of 3D-vision systems described above, for example a 3D scanner or a time-of-flight camera or a stereoscopic system. The means 302 for processing data may be a processor and a memory. The processor may be a generic processor, a specific processor, an application-specific integrated circuit (ASIC) or a field-programmable gate array (FPGA).

The device 300 may also include a means for displaying the captured data in 3D or in 2D.

Although the invention was described with reference to particular embodiments, obviously it is in no way limited thereto and comprises any technical equivalent of the described means and combinations thereof if they fall within the scope of the invention.

The invention claimed is:

1. A method for characterizing a scene by computing the 3D orientation of observed elements of the scene, this including a step of computing 3D points of the scene, said method comprising the steps of:
  regularly quantifying the 3D points of the scene, along three axes, in a preset 3D grid of voxels;
  for each non-empty voxel of the 3D grid, computing N predefined statistical characteristics from the coordinates of the points contained in the voxel, where N is an integer higher than 1, and for each of the N characteristics, defining a 3D grid associated with said characteristic;
  for each 3D grid associated with a statistical characteristic, computing an integral 3D grid associated with said statistical characteristic, each voxel of the integral 3D grid comprising an integral of said statistical characteristic; and for each non-empty voxel of the 3D grid of voxels:
    defining a 3D rectangular parallelepipedal vicinity centered on said voxel and of predefined 3D dimensions, and eight vertices of said vicinity;
    for each of the N statistical characteristics, computing the integral of the statistical characteristic in said vicinity on the basis of the eight vertices of the integral 3D grid associated with said statistical characteristic;
    computing the 3×3 covariance matrix of the 3D points in said vicinity; and
    computing the orientation of said voxel on the basis of the 3×3 covariance matrix.

2. The method for characterizing a scene by computing 3D orientation of claim 1, wherein the orientation of the voxel is computed via a principal component analysis.

3. The method for characterizing a scene by computing 3D orientation of claim 1, wherein the N statistical characteristics are selected from the following set: an average of coordinates, a weighting of coordinates, a correlation of coordinates, a standard deviation of coordinates, a higher-order moment of coordinates.

4. The method for characterizing a scene by computing 3D orientation of claim 1, wherein the dimensions of the vicinity are the same for each voxel.

5. The method for characterizing a scene by computing 3D orientation of claim 1, wherein the 3D points of the scene are obtained directly from a 3D sensor.

6. The method for characterizing a scene by computing 3D orientation of claim 1, wherein the 3D points of the scene are computed from a 3D disparity map obtained from a stereoscopic device acquiring 2D images of the scene.

7. A computer program product, comprising instructions stored on a tangible non-transitory storage medium for executing on a processor a method for characterizing a scene by computing the 3D orientation of observed elements of the scene, this including a step of computing 3D points of the scene, said method comprising the steps of:
    regularly quantifying the 3D points of the scene, along three axes, in a preset 3D grid of voxels;
    for each non-empty voxel of the 3D grid, computing N predefined statistical characteristics from the coordinates of the points contained in the voxel, where N is an integer higher than 1, and for each of the N characteristics, defining a 3D grid associated with said characteristic;
    for each 3D grid associated with a statistical characteristic, computing an integral 3D grid associated with said statistical characteristic, each voxel of the integral 3D grid comprising an integral of said statistical characteristic; and
    for each non-empty voxel of the 3D grid of voxels:
        defining a 3D rectangular parallelepipedal vicinity centered on said voxel and of predefined 3D dimensions, and eight vertices of said vicinity;
        for each of the N statistical characteristics, computing the integral of the statistical characteristic in said vicinity on the basis of the eight vertices of the integral 3D grid associated with said statistical characteristic;
        computing the 3×3 covariance matrix of the 3D points in said vicinity; and
        computing the orientation of said voxel on the basis of the 3×3 covariance matrix.

8. A tangible non-transitory processor-readable recording medium on which is recorded a program comprising instructions for executing a method for characterizing a scene by computing the 3D orientation of observed elements of the scene, this including a step of computing 3D points of the scene, said method comprising the steps of:
    regularly quantifying the 3D points of the scene, along three axes, in a preset 3D grid of voxels;
    for each non-empty voxel of the 3D grid, computing N predefined statistical characteristics from the coordinates of the points contained in the voxel, where N is an integer higher than 1, and for each of the N characteristics, defining a 3D grid associated with said characteristic;
    for each 3D grid associated with a statistical characteristic, computing an integral 3D grid associated with said statistical characteristic, each voxel of the integral 3D grid comprising an integral of said statistical characteristic; and
    for each non-empty voxel of the 3D grid of voxels:
        defining a 3D rectangular parallelepipedal vicinity centered on said voxel and of predefined 3D dimensions, and eight vertices of said vicinity;
        for each of the N statistical characteristics, computing the integral of the statistical characteristic in said vicinity on the basis of the eight vertices of the integral 3D grid associated with said statistical characteristic;
        computing the 3×3 covariance matrix of the 3D points in said vicinity; and
        computing the orientation of said voxel on the basis of the 3×3 covariance matrix.

\* \* \* \* \*